(12) United States Patent
Natarajan (10) Patent No.: US 10,476,947 B1
(45) Date of Patent: Nov. 12, 2019

(54) METHODS FOR MANAGING WEB APPLICATIONS AND DEVICES THEREOF

(71) Applicant: F5 Networks, Inc., Seattle, WA (US)

(72) Inventor: Ravi Natarajan, Fremont, CA (US)

(73) Assignee: F5 Networks, Inc, Seattle, WA (US)

( * ) Notice: Subject to any disclaimer, the term of this patent is extended or adjusted under 35 U.S.C. 154(b) by 340 days.

(21) Appl. No.: 15/057,495

(22) Filed: Mar. 1, 2016

Related U.S. Application Data (60) Provisional application No. 62/127,089, filed on Mar. 2, 2015.

(51) Int. Cl.
| | |
|---|---|
| *H04L 29/08* | (2006.01) |
| *H04W 4/20* | (2018.01) |
| *H04L 29/06* | (2006.01) |
| *H04L 12/24* | (2006.01) |

(52) U.S. Cl.
CPC ........ *H04L 67/1012* (2013.01); *H04L 41/082* (2013.01); *H04L 67/02* (2013.01); *H04L 67/42* (2013.01); *H04W 4/20* (2013.01)

(58) Field of Classification Search
CPC ... H04L 67/1012; H04L 41/082; H04L 67/02; H04L 67/42; H04W 4/20
USPC .......................... 709/201, 203, 204, 217, 220
See application file for complete search history.

(56) References Cited

U.S. PATENT DOCUMENTS

| | | | |
|---|---|---|---|
| 4,783,828 A | 11/1988 | Sadjadi et al. | |
| 5,537,488 A | 7/1996 | Menon et al. | |
| 6,118,893 A | 9/2000 | Li | |
| 6,769,066 B1 | 7/2004 | Botros et al. | |
| 6,856,414 B1 | 2/2005 | Haneda | |
| 7,406,606 B2 | 7/2008 | Chawla et al. | |
| 7,441,429 B1 | 10/2008 | Nucci et al. | |
| 7,624,447 B1 | 11/2009 | Horowitz et al. | |
| 7,743,415 B2 | 6/2010 | Poletto et al. | |
| 7,877,482 B1 | 1/2011 | Ashcraft et al. | |
| 8,572,733 B1 | 10/2013 | Rockwood | |
| 8,644,506 B2 | 2/2014 | Zellner | |
| 8,943,588 B1 | 1/2015 | Speegle | |
| 8,983,858 B2 | 3/2015 | Evans et al. | |
| 9,262,758 B2 | 2/2016 | Lee | |
| 9,578,055 B1 | 2/2017 | Khanal | |

(Continued)

OTHER PUBLICATIONS

F5 Networks Inc. "F5 BIG-IP Access Policy Manager Operations Guide 1.0" F5 Networks Inc., May 3, 2015, pp. 1-122.

(Continued)

*Primary Examiner* — Chirag R Patel
*Assistant Examiner* — Marshall M McLeod
(74) *Attorney, Agent, or Firm* — Pepper Hamilton LLP (57) ABSTRACT

A method, non-transitory computer readable medium and apparatus that manages web application servers includes receiving one or more changes to a compliance policy. One or more mobile application changes that is required on one or more mobile application executing on one or more mobile computing devices is determined. Next, an impact on a plurality of web application servers is determined based on the determined one or more mobile application changes and stored monitored data associated with the plurality of web application servers. A notification is provided based on the determined impact on the plurality of web application servers to manage the plurality of web application servers.

16 Claims, 5 Drawing Sheets

(56) References Cited

U.S. PATENT DOCUMENTS

| | | |
|---|---|---|
| 9,628,499 B1 | 4/2017 | Yu et al. |
| 9,690,925 B1 | 6/2017 | Banerjee |
| 9,900,344 B2 | 2/2018 | Smith et al. |
| 9,967,250 B2 | 5/2018 | Johansson et al. |
| 2003/0042439 A1 | 3/2003 | Rusu et al. |
| 2003/0073091 A1 | 4/2003 | Krylov et al. |
| 2003/0145232 A1 | 7/2003 | Poletto et al. |
| 2003/0199762 A1 | 10/2003 | Fritz et al. |
| 2004/0037326 A1 | 2/2004 | D'souza et al. |
| 2004/0170123 A1 | 9/2004 | Carpenter et al. |
| 2005/0111367 A1 | 5/2005 | Chao et al. |
| 2005/0195840 A1 | 9/2005 | Krapp et al. |
| 2005/0198519 A1 | 9/2005 | Tamura et al. |
| 2005/0227218 A1 | 10/2005 | Mehta |
| 2005/0278642 A1 | 12/2005 | Chang et al. |
| 2006/0031483 A1 | 2/2006 | Lund et al. |
| 2006/0031928 A1 | 2/2006 | Conley et al. |
| 2007/0118894 A1 | 5/2007 | Bhatia |
| 2007/0280114 A1 | 12/2007 | Chao et al. |
| 2007/0294187 A1 | 12/2007 | Scherrer |
| 2008/0028467 A1 | 1/2008 | Kommareddy et al. |
| 2008/0307100 A1 | 12/2008 | Duggirala et al. |
| 2008/0320567 A1 | 12/2008 | Shulman et al. |
| 2009/0150970 A1 | 6/2009 | Hinds et al. |
| 2009/0199297 A1 | 8/2009 | Jarrett et al. |
| 2009/0204815 A1 | 8/2009 | Dennis et al. |
| 2010/0031315 A1 | 2/2010 | Feng et al. |
| 2010/0070451 A1 | 3/2010 | Hugues |
| 2010/0284282 A1 | 11/2010 | Golic |
| 2011/0012586 A1 | 1/2011 | Montanar et al. |
| 2011/0022962 A1 | 1/2011 | Luo |
| 2011/0047075 A1 | 2/2011 | Fourez |
| 2011/0072516 A1 | 3/2011 | Cohen et al. |
| 2012/0079592 A1 | 3/2012 | Pandrangi et al. |
| 2012/0144487 A1 | 6/2012 | Kim et al. |
| 2012/0167210 A1 | 6/2012 | Oro et al. |
| 2012/0173710 A1 | 7/2012 | Rodriguez et al. |
| 2012/0174237 A1 | 7/2012 | Krzyzanowski |
| 2012/0311129 A1* | 12/2012 | Steuer .............. H04L 43/0876 709/224 |
| 2013/0078949 A1 | 3/2013 | Pecen |
| 2013/0080407 A1 | 3/2013 | Levow |
| 2013/0130651 A1 | 5/2013 | Deasy et al. |
| 2013/0175259 A1 | 6/2013 | Brosnan et al. |
| 2013/0197998 A1 | 8/2013 | Buhrmann |
| 2013/0225282 A1 | 8/2013 | Williams et al. |
| 2013/0276114 A1 | 10/2013 | Friedrichs et al. |
| 2013/0288692 A1 | 10/2013 | Dupray |
| 2013/0290407 A1 | 10/2013 | Maiya |
| 2014/0059695 A1 | 2/2014 | Parecki |
| 2014/0108649 A1 | 4/2014 | Barton et al. |
| 2014/0007117 A1 | 6/2014 | Sima et al. |
| 2014/0162693 A1 | 6/2014 | Wachter |
| 2014/0245379 A1 | 8/2014 | Oberheide et al. |
| 2014/0274136 A1 | 9/2014 | Edge et al. |
| 2014/0289854 A1 | 9/2014 | Mahvi |
| 2014/0317739 A1 | 10/2014 | Be'ery et al. |
| 2014/0331317 A1 | 11/2014 | Singh |
| 2015/0006710 A1 | 1/2015 | Sauerwald et al. |
| 2015/0032621 A1 | 1/2015 | Kar |
| 2015/0040246 A1* | 2/2015 | Yuen .................. H04L 63/168 726/30 |
| 2015/0088662 A1 | 3/2015 | Noller et al. |
| 2015/0120572 A1 | 4/2015 | Slade |
| 2015/0163234 A1 | 6/2015 | Tal et al. |
| 2015/0310196 A1 | 6/2015 | Turgeman et al. |
| 2015/0215334 A1 | 7/2015 | Bingham et al. |
| 2015/0227934 A1 | 8/2015 | Chauhan |
| 2015/0244645 A1* | 8/2015 | Lindo ................. H04L 47/823 709/224 |
| 2015/0288661 A1 | 10/2015 | Monk |
| 2015/0295945 A1 | 10/2015 | Canzanese et al. |
| 2016/0021117 A1 | 1/2016 | Harmon et al. |
| 2016/0127406 A1 | 5/2016 | Smith et al. |
| 2016/0219075 A1* | 7/2016 | Bailloeul .............. H04L 63/20 |
| 2017/0171231 A1 | 6/2017 | Reybok, Jr. et al. |
| 2017/0249306 A1 | 8/2017 | Allen et al. |
| 2017/0318053 A1 | 11/2017 | Singh et al. |
| 2018/0124300 A1 | 5/2018 | Brook |

OTHER PUBLICATIONS

F5 Networks Inc., "BIG IP® Global Traffic Manager™ : Implementations" F5 Networks Inc., Feb. 22, 2014, Version 11.4, pp. 1-106.

F5 Networks Inc., "BIG IP® Global Traffic Manager™ : Implementations" F5 Networks Inc., Nov. 19, 2014, Version 11.4, pp. 1-234.

F5 Networks Inc., "BIG-IP® TMOS® : Implementations" F5 Networks Inc., May 5, 2015, Version 11.4, pp. 1-234.

Sundberg J., "Mobile Application Management (MAM)", Technical Article, F5 Network, Inc., Feb. 21, 2013.

* cited by examiner

METHODS FOR MANAGING WEB APPLICATIONS AND DEVICES THEREOF

This application claims the benefit of U.S. Provisional Patent Application Ser. No. 62/127,089, filed on Mar. 2, 2015, which is hereby incorporated by reference in its entirety.

FIELD

This technology relates to methods for application management and, specifically, to methods for managing one or more web applications and devices thereof.

BACKGROUND

The management of applications, such as web applications, encompasses a variety of tasks including managing mobile application policies, mobile computing device security, and access policies. In an enterprise network environment, access to such web applications is governed by these policies, which may change over time as the set of enrolled users and their respective rights under the various policies also change.

To accommodate these changes, an administrator may implement policy changes on an individual or group basis, which may result in far-reaching effects on the functioning of any devices or applications that are encompassed, sometimes indirectly, by the policy changes. Some of the consequences of these changes are difficult to predict and as a result the effects of these changes, some of which may not be desirable, are not known until after the policies have been implemented. As such, a way to preview the effects of the changes to the applications before the changes are actually implemented would be of great benefit in the administration of these policies.

Accordingly, there is a need for a technology that is able to manage applications, such as web applications, in a seamless and efficient manner in order that a preview of changes in enrollment, security, and compliance policies may be provided, thereby avoiding the implementation of overly burdensome changes on existing resources.

SUMMARY

A method for managing web application servers, the method comprising receiving, by a mobile application manager computing apparatus, one or more changes to a compliance policy. The mobile application manager computing apparatus then determines one or more mobile application changes required on one or more mobile applications executing on one or more mobile computing devices. The mobile application manager computing apparatus determines an impact on a plurality of web application servers based on the determined one or more mobile application changes and stored monitored data associated with the plurality of web application servers. The mobile application manager computing apparatus provides a notification based on the determined impact on the plurality of web application servers to manage the plurality of web application servers.

A non-transitory computer readable medium having stored thereon instructions for managing web application servers comprising executable code which when executed by one or more processors, causes the processors to perform steps comprising receiving one or more changes to a compliance policy. One or more mobile application changes required on one or more mobile applications executing on one or more mobile computing devices are then determined. An impact on a plurality of web application servers based on the determined one or more mobile application changes and stored monitored data associated with the plurality of web application servers is determined. A notification based on the determined impact on the plurality of web application servers to manage the plurality of web application servers is provided.

A mobile application manager apparatus comprising memory comprising programmed instructions stored in the memory, one or more processors configured to be capable of executing the programmed instructions stored in the memory to receive one or more changes to a compliance policy. The mobile application manager computing apparatus then determines one or more mobile application changes required on one or more mobile applications executing on one or more mobile computing devices. The mobile application manager computing apparatus determines an impact on a plurality of web application servers based on the determined one or more mobile application changes and stored monitored data associated with the plurality of web application servers. The mobile application manager computing apparatus provides a notification based on the determined impact on the plurality of web application servers to manage the plurality of web application servers.

This technology provides a number of advantages including providing effective methods, non-transitory computer readable media, and apparatuses, for managing web application servers. With this technology, a notification of the impact of compliance policy changes to be implemented on web application servers allows for more effective compliance policy management. Additionally, this technology provides the benefits that accrue from proactive management of impact changes in a web application server environment.

DETAILED DESCRIPTION

Figure 1:
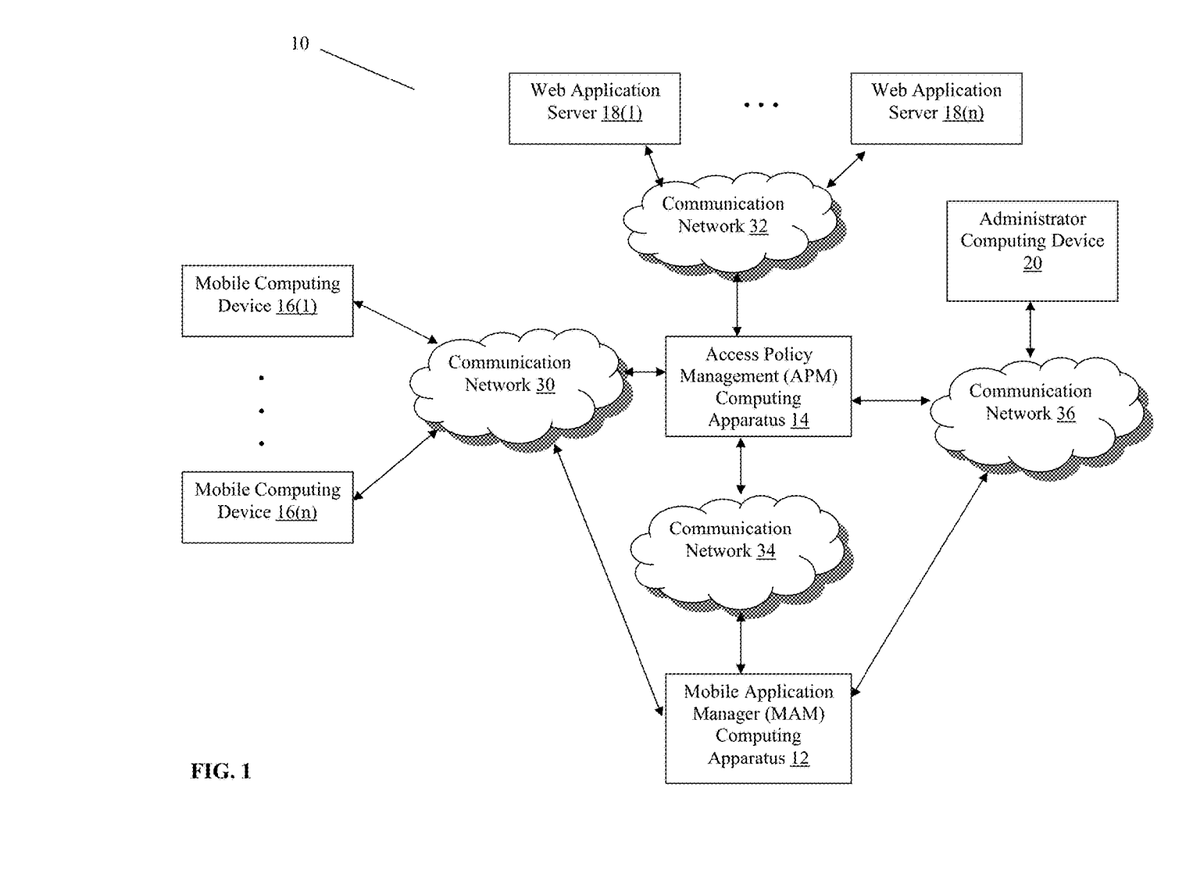
FIG. 1 is a block diagram of a network environment with an exemplary mobile application manager (MAM) computing apparatus and access policy management (APM) computing apparatus.
Figure 2:
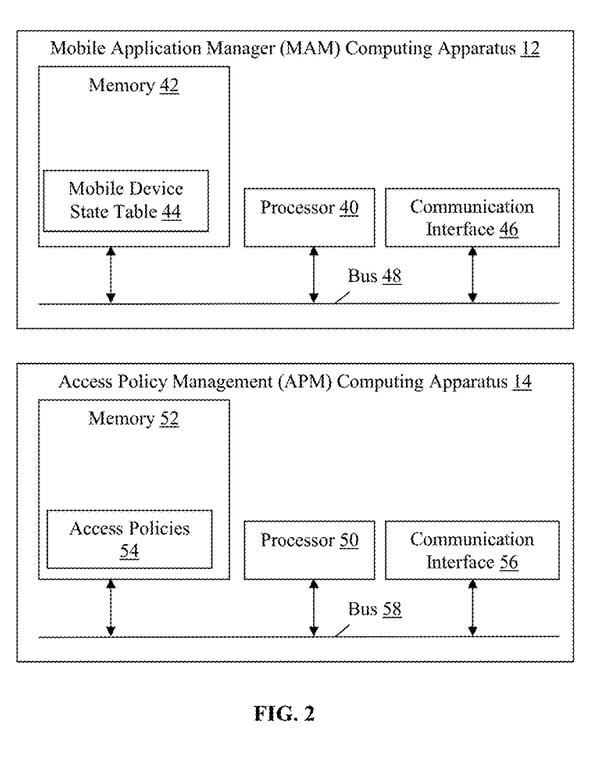
FIG. 2 is a block diagram of the exemplary MAM and APM computing apparatuses shown in FIG. 1.

A network environment 10 with an example of a mobile application manager (MAM) computing apparatus 12 for more effectively managing web application servers is illustrated in FIGS. 1-2. This environment 40 includes the mobile application manager computing apparatus 12, an access policy management computing apparatus 14, mobile computing devices 16(1)-16(n), a plurality of web application servers 18(1)-18(n), and an administrator computing device 20 which are coupled together through one or more communication networks 30, 32, 34, and 36 in this example, although the environment may include other types and/or numbers of other systems, devices, components, and/or other elements in other configurations. This technology provides a number of advantages including providing methods, non-transitory computer readable media, and apparatuses for more effectively managing web application servers.

Referring to FIGS. 1-2, the mobile application manager computing apparatus 12 may perform any type and/or number of functions or other operations, such as managing one or more web applications based on the impact of one or more mobile application manager (MAM) compliance policy changes on the plurality of web application servers 18(1)-18(n) by way of example only. The mobile application manager computing apparatus 12 includes a processor 40, a memory 42, and a communication interface 46 which are coupled together by a bus 48, although the mobile application manager computing apparatus 12 may include other types and/or numbers of systems, devices, components, and/or other elements in other configurations. In this example, the bus is a hyper-transport bus, although other types and/or numbers of buses and/or other communication links may be used, such as PCI. The mobile application manager computing apparatus 12 communicates with the mobile computing devices 16(1)-16(n) through one or more of the communication networks 30, 32, 34, and/or 36 to enroll users of the mobile computing devices 16(1)-16(n), control deployment of mobile applications and security policies installed on the mobile computing devices, perform periodic compliance checks on the mobile computing devices, and/or make changes to the mobile applications and security policies installed on the mobile computing devices by way of example only, although other types and/or numbers of other functions and/or operation can be provided by the mobile application manager computing apparatus 12.

The processor 40 of the mobile application manager computing apparatus 12 may execute programmed instructions stored in the memory 42 of the mobile application manager computing apparatus 12, such as the functions and/or other operations illustrated and described by way of the examples herein. The processor 40 of the mobile application manager computing apparatus 12 may include one or more CPUs or general purpose processors with one or more processing cores, for example, although other types of processor(s) can also be used.

The memory 42 of the mobile application manager computing apparatus 12 may store these programmed instructions for one or more aspects of the present technology as described and illustrated herein, although some or all of the programmed instructions could be stored and obtained from other locations for execution by the processor 40. A variety of different types of memory storage devices, such as a random access memory (RAM), a read only memory (ROM), hard disk, or other computer readable medium which is read from and written to by a magnetic, optical, or other reading and writing system that are coupled to the processor 40, can be used for the memory 42.

Figure 3:
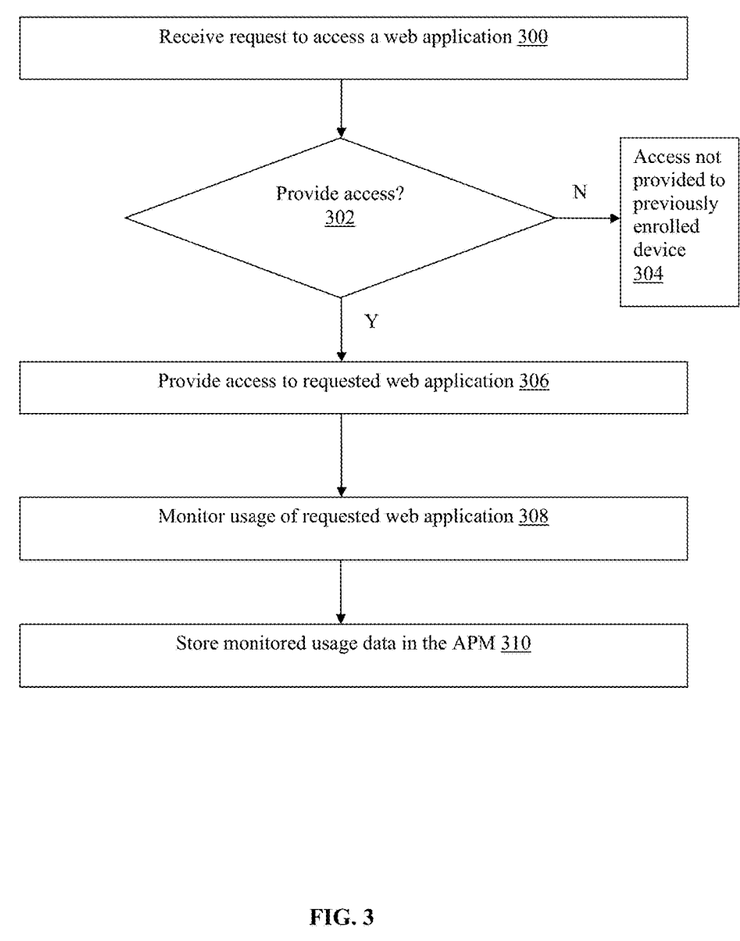
FIG. 3 is a flowchart of an exemplary method for monitoring web application usage.
Figure 4:
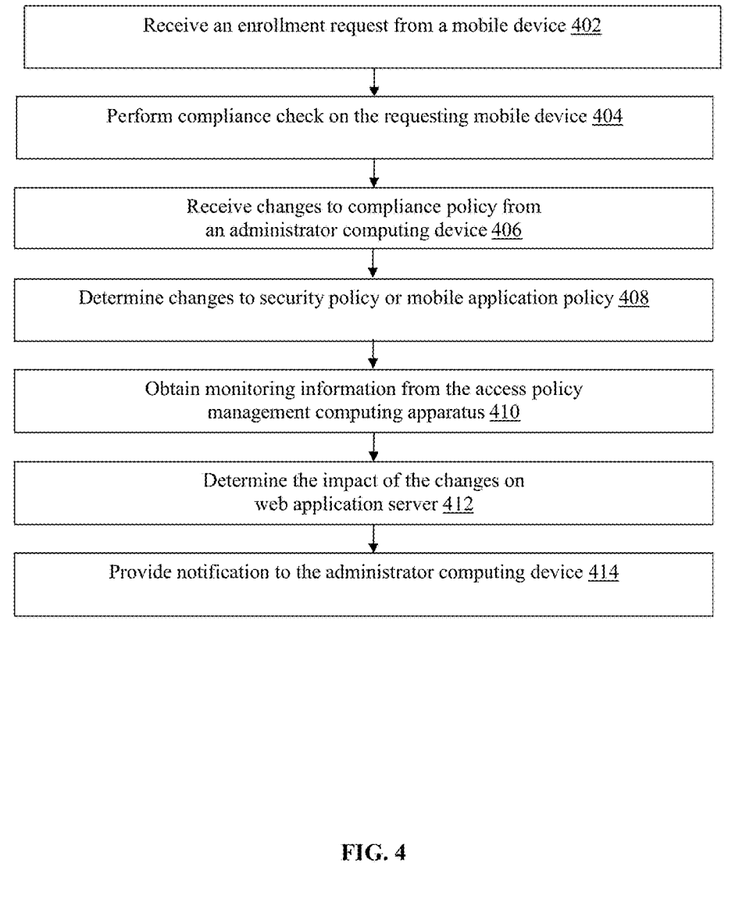
FIG. 4 is a flowchart of an exemplary method for providing a preview of the impact of compliance policy changes on one or more web application servers.

Accordingly, the memory 42 of the mobile application manager computing apparatus 12 can store one or more applications that can include computer executable instructions that, when executed by the processor 40 of the mobile application manager computing apparatus 12, cause the mobile application manager computing apparatus 12 to perform actions, to manage mobile applications, for example, and to perform other actions described and illustrated in the examples below with reference to FIGS. 3-5. The application(s) may also be implemented as modules, sets of programmed instructions, and/or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the mobile application manager computing apparatus 12 itself, may be located in virtual server(s) running in a cloud-based computing environment rather than being tied to one or more specific physical network computing devices. Also, the application(s) may be running in one or more virtual machines (VMs) executing on the mobile application manager computing apparatus 12. Additionally, in one or more embodiments of this technology, virtual machine(s) running on the mobile application manager computing apparatus 12 may be managed or supervised by a hypervisor.

In this particular example, the memory 42 of the mobile application manager computing apparatus 12 includes a mobile computing device state table 44, although the memory 42 can include other policies, modules, databases, and/or applications by way of example only. The mobile computing device state table 44 may have entries including at least an indication of the one or more mobile applications and security policies that are installed on each of the mobile computing devices 16(1)-16(n) enrolled with the mobile application management computing apparatus 10. Accordingly, the memory 42 of the mobile application manager computing apparatus 12 can store access policies which may be established by an administrator at the administrator computing device 20, although other types and/or numbers of other programmed instructions, tables, and/or other data could be stored. In this example, the memory 42 of the mobile application manager computing apparatus 12 includes a mobile computing device state table 44 for entries including at least an indication of the mobile applications and security policies that are installed on each of the mobile computing devices enrolled with the mobile application manager computing apparatus 12.

The communication interface 36 of the mobile application manager computing apparatus 12 operatively couples and communicates between the access policy management computing apparatus 14, the mobile computing devices 16(1)-16(n), the plurality of web application servers 18(1)-18(n), and the administrator computing device 20 which are coupled to the mobile application manager computing apparatus 12 and the access policy manager computing apparatus 12 through one or more of the communication networks 30, 32, 34, and/or 36 in this example, although other types and/or numbers of communication networks or systems with other types and/or numbers of connections and configurations to other devices and elements can also be used.

By way of example only, one or more of the communication networks 30, 32, 34, and/or 36 can use TCP/IP over Ethernet and industry-standard protocols, including NFS, CIFS, SOAP, XML, LDAP, and SNMP, although other types and/or numbers of communication networks, can be used. The one or more of the communication networks 30, 32, 34, and/or 36 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication networks 30, 32, 34, and/or 36 can also include direct connection(s) (e.g., for when the device illustrated in FIG. 1, such as the mobile application manager computing apparatus 12, access policy management computing apparatus 14, the mobile computing devices 16(1)-16(n), the plurality of web application servers 18(1)-18(n), and the administrator computing device 20 operate as virtual instances on the same physical machine).

While the mobile application manager computing apparatus 12 is illustrated in this example as including a single device, the mobile application manager computing apparatus 12 in other examples can include a plurality of physical devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the mobile application manager computing apparatus 12.

Additionally, one or more of the devices that together comprise the mobile application manager computing apparatus 12 in other examples can be standalone devices or integrated with one or more other devices or apparatus, such as one of the server devices, for example. Moreover, one or more of the devices of the mobile application manager computing apparatus 12 in these examples can be in a same or a different communication network including one or more public, private, or cloud networks, for example.

The access policy management computing apparatus 14 may perform any number of functions including providing access to the mobile computing devices 16(1)-16(n) to access web applications executing on the plurality of web application servers 18(1)-18(n), although access policy management computing apparatus 14 can perform other types and/or numbers of functions and/or other operations. The access policy management computing apparatus 14 includes a processor 50, a memory 52 which may store access policies 54, and a communication interface 56, which are coupled together by a bus 58 or other communication link, although the access policy management computing apparatus 14 can include other types and/or numbers of systems, devices, components, and/or other elements in other configurations. While it is shown in this example that the access policy management computing apparatus 14 is separate from the mobile application manager computing apparatus 12, the access policy management computing apparatus 14 and the mobile application manager computing apparatus 12 can be one single computing device in other examples. That is, either one of the mobile application manager computing apparatus 12 or the access policy management computing apparatus 14, can perform all the steps of the methods illustrated herein and a reference to the mobile application manager computing apparatus 12 is intended to include the examples where the access policy management computing apparatus 14 and the mobile application manager computing apparatus 12 are the same computing apparatus.

The mobile computing devices 16(1)-16(n) include one or more mobile applications which provide an interface for user interaction, although these devices may have other types and/or numbers of other applications and/or content. Additionally, the mobile computing devices 16(1)-16(n) may further include any type of computing device that can receive, render, send, and/or facilitate user interaction with a mobile application, such as mobile computing devices 16(1)-16(n), laptop computing devices, and/or tablet computing devices, by way of example. Each of the mobile computing devices 16(1)-16(n) includes a processor, a memory, and a communication interface, which are coupled together by a bus or other communication link, although other numbers and types of network devices could be used.

The mobile computing devices 16(1)-16(n) may run interface applications, such as Web browsers, or standalone mobile applications, that may provide an interface to make requests for and access applications from on one or more of the web application servers 18(1)-18(n) via communication network 30, although the mobile computing devices 16(1)-16(n) may also access applications from other computing devices through other communication networks. The mobile computing devices 16(1)-16(n) may further include a display device, such as a display screen or touchscreen, and/or an input device, such as a keyboard for example.

Each of the web application servers 18(1)-18(n) includes a processor, a memory, and a communication interface, which are coupled together by a bus or other communication link, although other numbers and types of network devices could be used. The web application servers 18(1)-18(n) may process requests received from requesting mobile computing devices 16(1)-16(n) via one or more communication networks 30, 32, 34, and/or 36 according to the HTTP-based application RFC protocol, for example. Various backend enterprise web applications may be operating on the web application servers 18(1)-18(n) and transmitting data (e.g., files or Web pages) to one or more of the mobile computing devices 16(1)-16(n) through the access policy management computing apparatus 14 in response to requests from the mobile computing devices 16(1)-16(n). The web application servers 18(1)-18(n) may be hardware or software or may represent a system with multiple servers in a server computing device pool, which may include internal or external networks.

Although the web application servers 18(1)-18(n) are illustrated as single web application servers, one or more actions of each of the web application servers 18(1)-18(n) may be distributed across one or more distinct network computing devices. Moreover, the web application servers 18(1)-18(n) are not limited to a particular configuration. Thus, the web application servers 18(1)-18(n) may contain a plurality of network computing devices that operate using a master/slave approach, whereby one of the network computing devices of the web application servers 18(1)-18(n) operate to manage and/or otherwise coordinate operations of the other network computing devices. The web application servers 18(1)-18(n) may operate as a plurality of network computing devices within a cluster architecture, a peer-to-peer architecture, virtual machines, or within a cloud architecture.

Thus, the technology disclosed herein is not to be construed as being limited to a single environment, and other configurations and architectures are also envisaged. For example, one or more of the web application servers 18(1)-18(n) illustrated in FIG. 1 can operate within the access policy management computing apparatus 14 itself, rather than as one or more stand-alone web application servers 18(1)-18(n) communicating with the access policy management computing apparatus 14 via the communication network 32. In this example one or more of the web application servers 18(1)-18(n) operates within the memory of the access policy management computing apparatus 14.

The administrator computing device 20 includes a processor, a memory, and a communication interface which are coupled together by a bus, although the administrator computing device 20 may include other types and/or numbers of systems, devices, components, and/or other elements in other configurations. In this example, the bus is a hyper-transport bus, although other bus types and communication links may be used, such as PCI. In this example, the administrator computing device 20 may assist with making changes to one or more policies, although the administrator computing device 20 can assist with performing other types and/or other operations.

Although the exemplary network environment 10 with the mobile application manager computing apparatus 12, access policy management computing apparatus 14, mobile computing devices 16(1)-16(n), plurality of web application servers 18(1)-18(n), administrator computing device 20, and communication networks 30, 32, 34, and 36 are described and illustrated herein, other types and/or numbers of systems, devices, components, and/or elements in other configuration or topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 10, such as the mobile application manager computing apparatus 12, the access policy management computing apparatus 14, the mobile computing devices 16(1)-16(n), plurality of web application servers 18(1)-18(n), and the administrator computing device 20, for example, may be configured to operate as virtual instances on the same physical machine. In other words, one or more of the mobile application manager computing apparatus 12, the access policy management computing apparatus 14, the mobile computing devices 16(1)-16(n), plurality of web application servers 18(1)-18(n), or the administrator computing device 20, may operate on the same physical device rather than as separate devices communicating through one or more communication network(s). Additionally, there may be more or fewer of the mobile application manager computing apparatus 12, the access policy management computing apparatus 14, the mobile computing devices 16(1)-16(n), the plurality of web application servers 18(1)-18(n), and the administrator computing device 20, than illustrated by way of example only in FIG. 1. The mobile computing devices 16(1)-16(n) could also be implemented as applications on the mobile application management computing apparatus 12 itself, as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, which when executed by a processor, cause the processor to carry out the steps necessary to implement the methods of the examples, as described and illustrated herein.

An example of a method for managing web applications by the access policy management computing apparatus 14 will now be described with reference to FIGS. 1-5. Referring more specifically to FIG. 3, a method for monitoring web application usage by the mobile computing devices 16(1)-16(n) is illustrated. In step 300, the access policy management computing apparatus 14 receives a request to access a web application executing on one of the plurality of web applications servers from one of the mobile computing devices 16(1)-16(n) that have been enrolled by the mobile application manager computing apparatus 12, although the access policy management computing apparatus 14 can receive other types and/or numbers of requests.

In step 302, for the received request, the access policy management computing apparatus 14 determines when to provide the access requested web application executing on the plurality of web application servers 18(1)-18(n) to the already enrolled requesting one of the one or more mobile computing device based on one or more access control checks. In this example, the access control checks can include data, rules, and/or policies that can assist the access policy management computing apparatus 14 in determining whether to provide access to one of the mobile computing devices 16(1)-16(n) that are requesting access to the web applications executing on the plurality of web application servers 18(1)-18(n).

Accordingly, in step 302, when the access policy management computing apparatus 14 determines that the access cannot be provided to the requesting one of the mobile computing devices 16(1)-16(n) due to one of the mobile computing devices 16(1)-16(n) having been previously enrolled for the requested application, then the No branch is taken to step 304 where access is not provided and this example of the method ends.

However, if in step 302 the access policy management computing apparatus 14 determines that access can be provided to the requesting one of the mobile computing devices 16(1)-16(n), then the Yes branch is taken to step 306, where the access policy management computing apparatus 14 allows the requesting one of the mobile computing devices 16(1)-16(n) to access the requested web application which may be executed on one or more of the plurality of web application servers 18(1)-18(n).

In step 308, the access policy management computing apparatus 14 monitors data related to the usage of the requested web application by the requesting one of the mobile computing devices 16(1)-16(n). In this example, monitored data related to the usage may include monitoring a usage pattern of the web application, bandwidth required by the requesting one of the mobile computing devices 16(1)-16(n) to use the web application, and/or other resources that are required to provide access to the requesting one of the one or more mobile computing devices 16(1)-16(n) to access the web application, although the access policy management computing apparatus 14 can monitor other types and/or amounts of usage data. The access policy management computing apparatus 14 may also monitor usage data including all requests from one of the mobile computing devices 16(1)-16(n) to access the web application executing on the web application servers 18(1)-18(n) when the requesting one of the mobile computing devices 16(1)-16(n) is determined to have complied with the access policy.

In step 310, the access policy management computing apparatus 14 stores the monitored data within the memory 50, although the access policy management computing apparatus 14 can store the monitored data at other memory locations. After storing the monitored data in memory 50, this example of the method for monitoring web application usage by the mobile computing devices 16(1)-16(n) ends.

Next, an example of a method for providing a preview of the impact of compliance policy changes on one or more web application servers 18(1)-18(n) using the monitored data illustrated above will be explained with reference to FIG. 4.

In step 402, the mobile application manager computing apparatus 12 receives an enrollment request with enrollment data from at least one of the mobile computing devices 16(1)-16(n), although the mobile application manager computing apparatus 12 can receive other types and/or number of requests and/or other data from the mobile computing devices 16(1)-16(n). By way of example only, the mobile application manager computing apparatus 12 may receive user credential data corresponding to the user of one of mobile computing devices 16(1)-16(n) as part of a subsequent request for access to an application, although the mobile application management device can receive other types and/or amounts of data from the mobile computing devices 16(1)-16(n), such as geographic location data for the requesting one of the mobile computing devices 16(1)-16(n). Additionally, along with the enrollment data, the mobile application manager computing apparatus 12 may also receive an IP address of one of mobile computing devices 16(1)-16(n).

In step 404, after receiving the enrollment request with enrollment data, the mobile application manager computing apparatus 12 performs a compliance check on at least one of the requesting mobile computing devices 16(1)-16(n). In this example, the compliance check relates to determining the geographic location of at least one of the mobile computing devices 16(1)-16(n) based on the received IP address, determining the mobile applications installed on the mobile computing devices 16(1)-16(n), or determining the security or privacy data associated with the mobile computing devices 16(1)-16(n), although the compliance check can relate to other types and/or numbers of other checks that can assist the mobile application manager computing apparatus 12 with management of one or more web applications.

In step 406, the mobile application manager computing apparatus 12 receives compliance policy change data indicating one or more changes to the compliance policy from the administrator computing device 20, although the mobile application manager computing apparatus 12 can receive the changes to the compliance policy from other devices. Although in this example, the compliance policy change data is received after receipt of the enrollment request with enrollment data, in other examples, receipt of the compliance policy change data may precede or be simultaneous with receipt of the enrollment request with enrollment data. Further, by way of example only, changes to the compliance policy may include allowing some or all of the enrolled mobile computing devices 16(1)-16(n) to access certain web applications on the plurality of web application servers 18(1)-18(n), although the changes can include other types or amounts of data.

In step 408, the mobile application manager computing apparatus 12 determines the changes that are required to the mobile applications and security policies within the compliance policy, based on the enrollment data and the received compliance policy change data indicating one or more changes to the compliance policy. In this example, the changes to the mobile applications relate to installing, uninstalling, blocking, or unblocking mobile applications on the enrolled mobile computing devices 16(1)-16(n), although other types or amounts of changes could be made to the mobile application based on the received one or more changes to the compliance policy.

In step 410, the mobile application manager computing apparatus 12 then obtains the monitored data from the access policy management computing apparatus 14. This monitored data was monitored and stored using technique that was illustrated in FIG. 3. As previously illustrated, monitored data relates to data associated with the usage pattern of the web applications, bandwidth required by at least one of the requesting mobile computing devices 16(1)-16(n) to use the web application, or other resources that are required to provide access to the requesting mobile computing devices 16(1)-16(n) to access the mobile applications, although the monitored data can include other types or amounts of data.

In step 412, the mobile application manager computing apparatus 12 determines the impact on the plurality of web application servers 18(1)-18(n) based on the determined changes required for the mobile applications executing on the enrolled mobile computing devices 16(1)-16(n) and the obtained monitored data associated with the plurality of web application servers 18(1)-18(n). In this example, the impact on the plurality of web application servers 18(1)-18(n) may include data associated with increased or decreased workload on the plurality of web application servers 18(1)-18(n), although impact can relate to other types or amounts of data.

In step 414, based on the determined impact, the mobile application manager computing apparatus 12 provides a notification to the administrator computing device 20 as a response to receiving the changes to the compliance policy at which point the exemplary method ends. As illustrated above, the notification can relate to indicating that the changes to the compliance policy may result in an increase or decrease of work load on the plurality of web application servers 18(1)-18(n), although the notification can include other types or amounts of data. Based on the notification, the administrator computing device 20 may make a determination to enforce the compliance policy changes on the enrolled mobile computing devices 16(1)-16(n).

Figure 5:
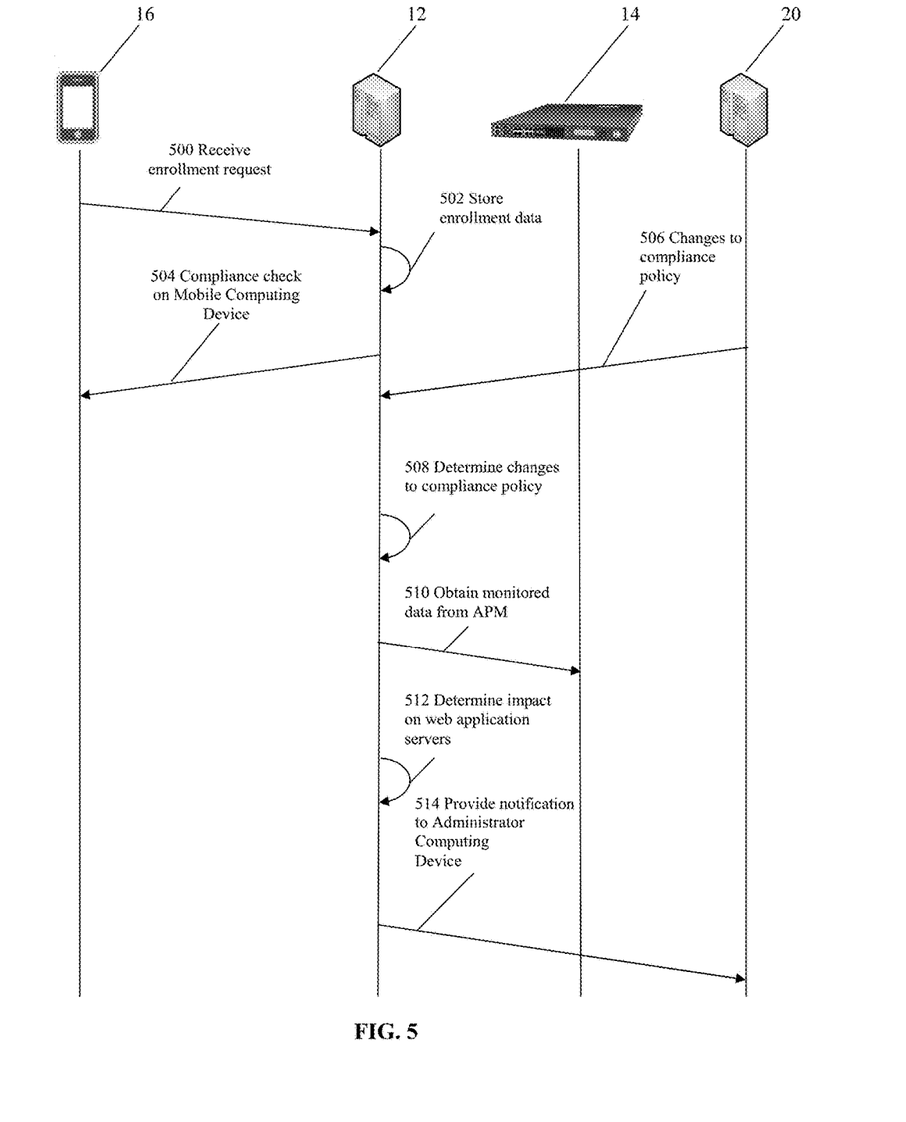
FIG. 5 is an exemplary a timing diagram illustrating an exemplary method for providing a preview of the impact of compliance policy changes on one or more web application servers.

Referring more specifically to FIG. 5, a timing diagram illustrating an exemplary method for providing a preview of the impact of compliance policy changes on one or more web application servers 18(1)-18(n) using the monitored data illustrated above will be shown.

In step 500, the mobile application computing apparatus 10 receives an enrollment request which includes enrollment data through communication network 30, from one of mobile computing devices 16(1)-16(n), although the enrollment request may be received from other types of devices.

In step 502, the mobile application computing apparatus 10 stores the enrollment data from the enrollment request in memory 42. The enrollment data may be stored as one or more entries in computing device state table 44.

In step 504, after the enrollment data is stored, the mobile application computing apparatus 10 performs a compliance check on the mobile computing devices 16(1)-16(n) that sent the enrollment request, in order to determine the applications to install on the mobile computing devices 16(1)-16(n).

In step 506, the administrator computing device 20 sends changes to the compliance policy through communication network 36, to the mobile application computing apparatus 10. In this example, the administrator computing device 20 sends compliance policy change data indicating that all of the mobile computing devices 16(1)-16(n) will be granted access to a mobile e-mail application. Although in this example, the compliance policy change data is received after receiving and storing the enrollment request with enrollment data there is no dependency between the enrollment request and the compliance policy change data. In other examples, receipt of the compliance policy change data may precede or be simultaneous with receipt of the enrollment request with enrollment data.

In step 508, the mobile application computing apparatus 10 determines the changes to the compliance policy that will result from the compliance policy change data sent by the administrator computing device 20. In this example, the mobile computing devices 16(1)-16(n), including the mobile computing devices 16(1)-16(n) that were previously restricted from accessing the mobile e-mail application are granted access to the mobile e-mail application.

In step 510, the mobile application manager computing apparatus 12 obtains the monitored data through communication network 34 from the access policy management computing apparatus 14. In this example, the monitored data was obtained and stored using the technique illustrated in FIG. 3 and includes the bandwidth requirements required by the mobile computing devices 16(1)-16(n) to use the mobile e-mail application.

In step 512, the mobile application computing apparatus 10 determines the impact on the web application servers 18(1)-18(n) based on the changes that will be required to execute the mobile e-mail application on the enrolled mobile computing devices 16(1)-16(n) and the obtained monitored data from the access policy management computing apparatus 14.

In step 514, the mobile application computing apparatus 10 provides a notification to administrator computing device 20 through communication network 36. In this example, the notification includes an indication that the changes to the compliance policy will result in a greater work load on the web application servers 18(1)-18(n). Based on this notification, a decision may then be made with respect to how to enforce the compliance policy changes.

With the disclosed technology, a preview or notification of the impact of one or more requests for one or more compliance policy changes on web application servers may be provided. Based on the notification of the impact on the web application servers that results from the one or more requests for one or more compliance policy changes, the mobile application manager computing apparatus may assist with changing the back-end infrastructure (e.g. adding or taking down one or more web application servers) before enforcing any of the one or more compliance policy changes. Accordingly, with the disclosed technology, more effective management of compliance policy changes is possible and potential performance degradation or access failure may be reduced or averted.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for predictive analysis of compliance policy change impact in enterprise networks to reduce performance degradation and access failures, the method implemented by a network traffic management system comprising one or more mobile application manager computing apparatuses, access policy management computing apparatuses, mobile computing devices or web application server devices and comprising:
monitoring network traffic exchanged between one or more mobile applications and a plurality of mobile devices in an enterprise network to generate and store utilization data, the mobile applications hosted by one or more web application servers;
determining one or more mobile application changes required for one or more of the mobile applications in response to one or more obtained changes to a compliance policy associated with the enterprise network;
determining an impact on one or more of the web application servers based on the determined mobile application changes and the stored utilization data generated based on the network traffic monitoring; and
providing a notification via one or more communication networks based on the determined impact on the one or more of the web application servers to thereby facilitate improved infrastructure management for the enterprise network.

2. The method as set forth in claim 1, wherein the stored utilization data comprises usage pattern data for the web applications that are accessed by the mobile devices or bandwidth usage data for the mobile devices that use the web applications.

3. The method as set forth in claim 1, wherein the determining the mobile application changes further comprises selectively uninstalling or installing, or disabling one or more features within, one or more of the mobile applications.

4. The method as set forth in claim 1, wherein the determining the impact further comprises adding one or more new web application servers or removing the one or more of the web application servers.

5. A non-transitory computer readable medium having stored thereon instructions for predictive analysis of compliance policy change impact in enterprise networks to reduce performance degradation and access failures comprising executable code which when executed by one or more processors, causes the processors to:
monitor network traffic exchanged between one or more mobile applications and a plurality of mobile devices in an enterprise network to generate and store utilization data, the mobile applications hosted by one or more web application servers;
determine one or more mobile application changes required for one or more of the mobile applications in response to one or more obtained changes to a compliance policy associated with the enterprise network;
determine an impact on one or more of the web application servers based on the determined mobile application changes and the stored utilization data generated based on the network traffic monitoring; and
provide a notification via one or more communication networks based on the determined impact on the one or more of the web application servers to thereby facilitate improved infrastructure management for the enterprise network.

6. The medium as set forth in claim 5, wherein the stored utilization data comprises usage pattern data for the web applications that are accessed by the mobile devices or bandwidth usage data for the mobile devices that use the web applications.

7. The medium as set forth in claim 5, wherein the executable code when executed by the processors further causes the processors to selectively uninstall or install, or disable one or more features within, one or more of the mobile applications.

8. The medium as set forth in claim 5, wherein the executable code when executed by the processors further causes the processors to add one or more new web application servers or remove the one or more of the web application servers.

9. A mobile application manager apparatus, comprising memory comprising programmed instructions stored thereon and one or more processors configured to be capable of executing the stored programmed instructions to:
monitor network traffic exchanged between one or more mobile applications and a plurality of mobile devices in an enterprise network to generate and store utilization data, the mobile applications hosted by one or more web application servers;
determine one or more mobile application changes required for one or more of the mobile applications in response to one or more obtained changes to a compliance policy associated with the enterprise network;
determine an impact on one or more of the web application servers based on the determined mobile application changes and the stored utilization data generated based on the network traffic monitoring; and
provide a notification via one or more communication networks based on the determined impact on the one or more of the web application servers to thereby facilitate improved infrastructure management for the enterprise network.

10. The apparatus as set forth in claim 9, wherein the stored utilization data comprises usage pattern data for the web applications that are accessed by the mobile devices or bandwidth usage data for the mobile devices that use the web applications.

11. The apparatus as set forth in claim 9, wherein the processors are further configured to be capable of executing the stored programmed instructions to selectively uninstall or install, or disable one or more features within, one or more of the mobile applications.

12. The apparatus as set forth in claim 9, wherein the processors are further configured to be capable of executing the stored programmed instructions to add one or more new web application servers or remove the one or more of the web application servers.

13. A network traffic management system comprising one or more mobile application manager computing apparatuses, access policy management computing apparatuses, mobile computing devices or web application server devices, the network traffic management system comprising memory comprising programmed instructions stored thereon and one or more processors configured to be capable of executing the stored programmed instructions to:
monitor network traffic exchanged between one or more mobile applications and a plurality of mobile devices in an enterprise network to generate and store utilization data, the mobile applications hosted by one or more web application servers;
determine one or more mobile application changes required for one or more of the mobile applications in response to one or more obtained changes to a compliance policy associated with the enterprise network;
determine an impact on one or more of the web application servers based on the determined mobile application changes and stored utilization data generated based on the network traffic monitoring; and
provide a notification via one or more communication networks based on the determined impact on the one or more of the web application servers to facilitate improved infrastructure management for the enterprise network.

14. The network traffic management system of claim 13, wherein the stored utilization data comprises usage pattern data for the web applications that are accessed by the mobile devices or bandwidth usage data for the mobile devices that use the web applications.

15. The network traffic management system of claim 13, wherein the processors are further configured to be capable of executing the stored programmed instructions to selectively uninstall or install, or disable one or more features within, one or more of the mobile applications.

16. The network traffic management system of claim 13, wherein the processors are further configured to be capable of executing the stored programmed instructions to add one or more new web application servers or remove the one or more of the web application servers.

* * * * *